United States Patent [19]
Betts et al.

[11] Patent Number: 5,828,657
[45] Date of Patent: Oct. 27, 1998

[54] HALF-DUPLEX ECHO CANCELER TRAINING USING A PILOT SIGNAL

[75] Inventors: William Lewis Betts, St. Petersburg; Ramon B. Hazen, North Redington Beach; Robert Earl Scott, Indian Rocks Beach, all of Fla.

[73] Assignee: Paradyne Corporation, Largo, Fla.

[21] Appl. No.: 536,916

[22] Filed: Sep. 29, 1995

[51] Int. Cl.$^6$ .................................................. H04J 15/00
[52] U.S. Cl. .......................... 370/289; 370/269; 370/290; 370/292; 375/222; 375/231; 375/350; 379/410
[58] Field of Search .................................... 370/286, 289, 370/290, 291, 292, 296, 269; 375/296, 222, 340, 348, 349, 350; 379/388, 410, 411; 455/43

[56] References Cited

U.S. PATENT DOCUMENTS

| | | | |
|---|---|---|---|
| 4,766,589 | 8/1988 | Fisher | 370/291 |
| 4,792,940 | 12/1988 | Hiraguchi | 370/292 |
| 4,912,758 | 3/1990 | Arbel | 379/388 |
| 5,507,033 | 4/1996 | Dolan | 375/296 |
| 5,533,048 | 7/1996 | Dolan | 375/340 |

*Primary Examiner*—Douglas W. Olms
*Assistant Examiner*—Shick Hom
*Attorney, Agent, or Firm*—Thomas, Kayden, Horstemeyer & Risley

[57] ABSTRACT

A far-end modem transmits a "pilot tone" during the time that a near-end modem is training its echo canceler. Correspondingly, the near-end modem is modified to notch, or filter, out this pilot tone from the received signal. The filtered received signal is then used by the near-end modem to train its echo canceler.

6 Claims, 5 Drawing Sheets

CELLULAR ORIGINATING MODEM

PSTN ANSWERING MODEM

300

CELLULAR ANSWERING MODEM

PSTN ORIGINATING MODEM

HALF-DUPLEX ECHO CANCELER TRAINING USING A PILOT SIGNAL

CROSS-REFERENCE TO RELATED APPLICATIONS

Related subject matter is disclosed in the co-pending commonly assigned, U.S. Patent applications of: Betts et al., entitled "Echo Canceling Method and Apparatus for Data Over Cellular," Ser. No. 08/536,908, filed on Sep. 29, 1995; Betts et al., entitled "Echo Canceler Gain Tracker for Cellular Modems," Ser. No. 08/536,917, filed on Sep. 29, 1995.

BACKGROUND OF THE INVENTION

The present invention relates to data communications equipment, e.g., modems, and, more particularly, to echo-canceling modems.

Today, the North American cellular system is predominately an analog system sometimes referred to as AMPS (Advanced Mobile Phone Service). The corresponding cellular communications channel is sometimes referred to as an "impaired channel" since it is affected by a number of channel impairments like Rayleigh fading, co-channel interference, etc., that increase the error rate and, thus, degrade the overall performance of the mobile connection. This is in contrast to a land-line communications channel, where the predominant impairment is additive white gaussian noise (AWGN). Those in the art have realized that one way to improve data transmission rates in the cellular environment is to use a data protocol that is better suited to combating the effects of the cellular environment over the cellular portion of the data connection. One example of a cellular-oriented protocol is the "Enhanced Throughput Cellular" (ETC) protocol, developed by AT&T Paradyne.

Nevertheless, even with a cellular-oriented protocol, impairments in the cellular channel continue to limit the effective data rate over the cellular channel. For example, reliable, i.e., consistent, data transmission over 9600 bits per second (bps) is difficult to maintain.

SUMMARY OF THE INVENTION

Notwithstanding the above-mentioned impairments present in the cellular channel, we have discovered a non-linearity in the cellular AMPS network that has been effecting the ability to reliably maintain cellular data rates over 9600 bps. In particular, when a cellular modem is performing training with a far-end PSTN modem, the cellular AMPS network distorts a far-end echo signal that is used by the cellular modem to train its echo canceler. We estimate that this distortion of the far-end echo signal occurs in approximately 40% of the AMPS cellular infrastructure. The source of the distortion of the far-end echo signal is due to a non-linear compander in some base-station radios and the half-duplex approach that modems use to train echo cancelers. The result is that the echo canceler of the cellular modem is not properly trained thereby causing a residual echo signal to exist. This residual echo signal limits the maximum cellular data rate to 9600 bps (often, this cellular data rate is reduced to 7200 bps.) Without this residual echo signal, the cellular modem and PSTN modem could often achieve a data rate of 14,400 bps (and even higher in the future).

Therefore, and in accordance with the invention, we have developed a method and apparatus for reducing the residual echo signal, which is effectively caused by the above-mentioned distortion of the far-end echo signal during training. In particular, during the above-mentioned half-duplex training phase a far-end modem does not remain silent but, instead, transmits a pilot tone to the near-end modem during the time that the near-end modem is training its echo canceler. This pilot tone is of a high enough signal level to cause the above-mentioned compander to achieve its linear range. As a result, this invention eliminates the incorrect training caused by the distortion of the far-end echo signal, thereby providing the ability to reliably maintain cellular data rates greater than 9600 bps.

In an embodiment of the invention, the PSTN modem transmits a "pilot tone" during the time that the cellular modem is training its echo canceler. This pilot tone is of a high enough signal level to cause the compander to achieve its linear range. The cellular modem is modified to notch, or filter, out this pilot tone from the received signal. The filtered received signal is then used by the cellular modem to train its echo canceler. Since the above-mentioned compander is now in the same linear range that it will be in when the both modems go into full-duplex mode, the echo canceler is properly trained to the far-echo signal. Residual echo is thus eliminated and the modem can achieve its highest data rate.

DETAILED DESCRIPTION

Figure 1:
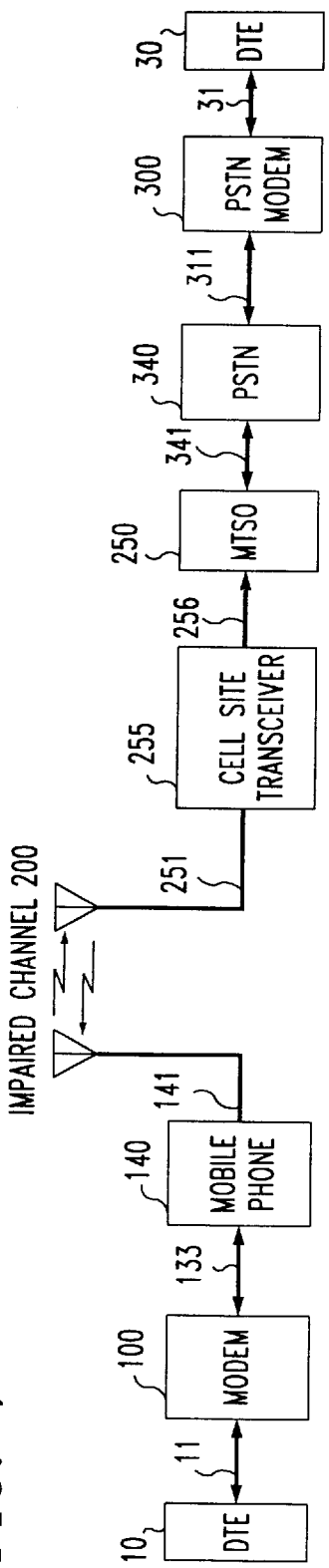
FIG. 1 is a block diagram of a mobile data communications system embodying the principles of the invention.

Other than the inventive concept, the elements of FIG. 1 function as in the prior art and will not be described in detail. FIG. 1 shows a block diagram of a mobile data communications system that includes cellular modem 100, which embodies the inventive concept. As shown, cellular modem 100 is coupled to mobile phone 140 for transmitting data signals to, and receiving data signals from, PSTN modem 300 via cell site transceiver 255, impaired channel 200, Mobile Telecommunications Switching Office (MTSO) 250, and PSTN 340. Both cellular modem 100 and PSTN modem 300 are also coupled to respective data terminal equipment (DTE) 10 and 30.

Before describing the inventive concept, the following is a brief overview of the operation of the mobile data communications system of FIG. 1 once a data connection is established, i.e., after training has been completed. A data signal is applied to cellular modem 100, via line 11, from DTE 10 for transmission to PSTN modem 300. Line 11 represents the signaling, electronics, and wiring, for conforming to a DTE/DCE (data communications equipment) interface standard like EIA RS-232. Cellular modem 100 modulates this data signal as is known in the art to, typically, a quadrature amplitude modulated (QAM) signal, which is provided via line 133 to mobile phone 140. Although not necessary to the inventive concept, it is assumed for the purposes of this example that the modem signal is compatible with International Telecommunications Union (ITU) standard V.32bis. Mobile phone 140 further modulates this transmission signal onto a predefined cellular carrier to provide a cellular data signal to antenna 141. Cell site transceiver 255 receives the cellular data signal via antenna 251 and provides a received modem signal to MTSO 250 for transmission, via public-switched-telephone network 340, to a far-end data endpoint as represented by PSTN modem 300 and DTE 30. Ideally, the data signal received by DTE 30 from PSTN modem 300 is identical to the data signal provided by DTE 10 to cellular modem 100. Transmission of data signals in the opposite direction, i.e., from DTE 30 to DTE 10 occurs in a like fashion.

However, before establishing a data connection, modems, as known in the art, perform a standard sequence of signaling that is also referred to as hand-shaking or training. This signaling determines such parameters as data rate, modulation to use, and trains, or sets, what is known in the art as filter tap coefficient values for filters like echo-cancelers and equalizers, which combat interference and distortion effects caused by the communications channel. As known in the art, the training sequence for an echo canceler is performed half-duplex. Full-duplex training of the echo canceler, while theoretically possible, is not practical from a price/performance viewpoint in the design of data communications equipment.

Figure 2:
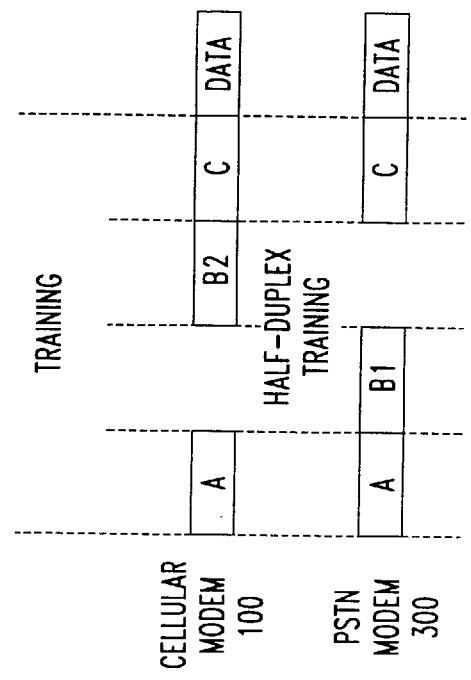
FIG. 2 shows an illustrative portion of a training sequence.

Since different data communications standards like ITU V.32bis and ITU V.34 have different training sequences, a generalized representation of a training sequence comprising a number of phases is illustrated in FIG. 2. It is assumed that cellular modem 100 is the calling modem and that PSTN modem 300 is the answering modem. As shown in FIG. 2, the training sequence is initially full-duplex during phase "A." The latter is followed by a phase "B," which is half-duplex and is additionally divided into two portions: "B1" and "B2". In portion "B1", of phase "B," the called modem, PSTN modem 300, sends a signal to train the echo canceler of PSTN modem 300 while the cellular modem 100 is silent. Then, in portion "B2", of phase "B," the calling modem, cellular modem 100, sends a signal to train the echo canceler of cellular modem 100 while the far-end PSTN modem is silent. To complete the description of FIG. 2, after half-duplex training phase "B," both modems enter a subsequent full-duplex training phase "C," which is then followed by a "DATA" phase in which data is actually communicated between the two modems.

During the respective half-duplex training portions of phase "B," each modem uses the returned far-end echo signal to adjust the tap coefficients of its echo canceler. The far-end echo signal is a result of subsequent 4-wire to 2-wire signal conversion within the PSTN, as is known in the art. (It should be noted that other components are also adjusted during training, e.g., equalizer coefficients, etc. However, for the purposes of this example, only the echo canceler training is described.)

In the cellular network, the base station radio—cell site transceiver 255—performs audio processing. One of the audio processing stages is a compander (not shown). The compander is linear over a given signal range. Unfortunately, we have discovered that some companders are not linear in the signal range of the returned far-end echo signal during the half-duplex training phase. As a result, this non-linearity of the compander results in training the echo canceler of the cellular modem to a distorted far-end echo signal. However, when the cellular modem subsequently goes into full duplex mode, i.e., both transmitting a signal to, and receiving a signal from, the PSTN modem, the received signal level passing through cell site transceiver 255 causes the compander to operate in its linear range. This change in compander operation results in a gain change in the echo path that causes a degradation in echo canceler performance resulting in a large "residual echo" in the cellular modem. In other words, there is a loss of echo cancellation. This residual echo signal limits the maximum cellular data rate to 9600 bps (often, this cellular data rate is reduced to 7200 bps.) Without this residual echo signal, the cellular modem and PSTN modem could often achieve a data rate of 14,400 bps (and even higher in the future).

This problem can be solved by modems with a four-wire interface at the PSTN-side of the cellular data connection. For example, a cellular network that includes a cellular modem pool, as well as "mu-law" modem pools being installed at customer locations solve this problem. Unfortunately, a large number of cellular users will still be calling 2-wire PSTN modems for the foreseeable future. In addition, this problem could be solved by allowing continued adaptation of the echo canceler during data transmission. However, this adaptation process can be slow. Unfortunately, some modems (as represented by cellular modem 100) only adapt during the training sequence to conserve hardware requirements, such as memory, and thereby reduce the cost of the data communications equipment.

Therefore, and in accordance with the invention, we have developed a method and apparatus for reducing the residual echo signal, which is effectively caused by the above-mentioned switching between a linear mode of operation and a nonlinear mode of operation of a network compander. In particular, during the above-mentioned half-duplex training phase a PSTN modem does not remain silent but, instead, transmits a pilot tone to the cellular modem during the time that the cellular modem is training its echo canceler. This pilot tone is of a high enough signal level to cause the above-mentioned compander to achieve its linear range. As a result, this invention eliminates the incorrect training caused by the distortion of the far-end echo signal, thereby providing the ability to reliably maintain cellular data rates greater than 9600 bps.

Figure 3:
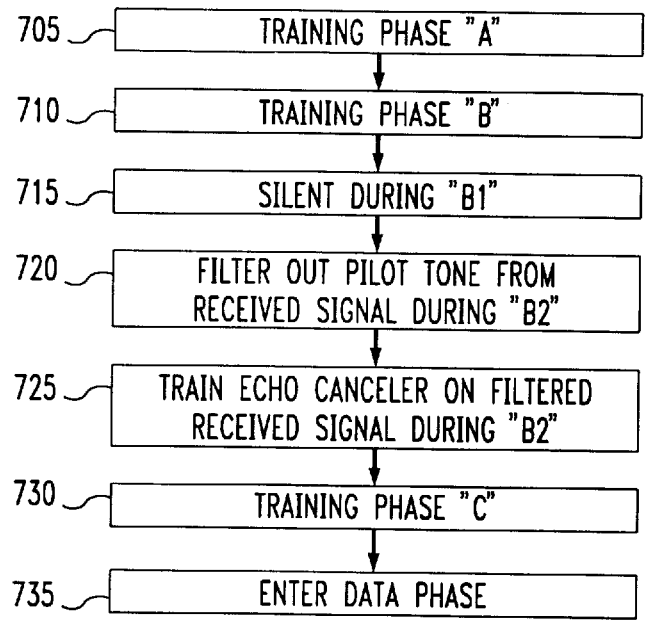
FIG. 3 is a flow diagram of an illustrative method for use in an originating modem in accordance with the principles of the invention.
Figure 4:
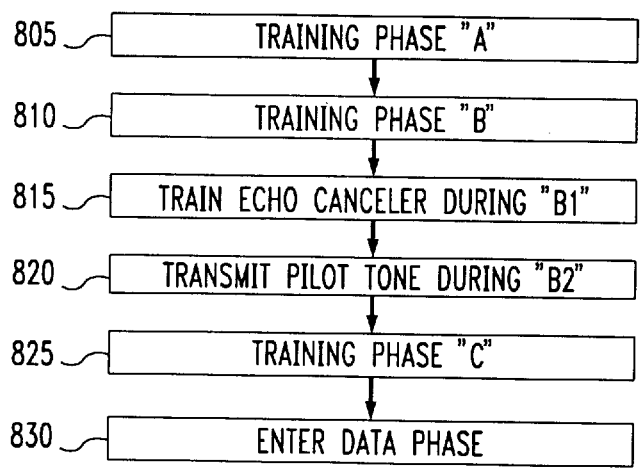
FIG. 4 is a flow diagram of an illustrative method for use in an answering modem in accordance with the principles of the invention.

In order to facilitate understanding of the inventive concept reference should now be made to FIGS. 3 and 4, which represent illustrative methods for use in an originating modem and answering modem, respectively. For the purposes of this description, cellular modem 100 is illustratively the originating modem and PSTN modem 300 is illustratively the answering modem. For simplicity, the steps of dialing (in cellular modem 100), and answering (by PSTN modem 300), are not shown.

First, attention should be directed to FIG. 3. In step 705, cellular modem 100 enters training, e.g., representative phase "A," shown in FIG. 2. Following training phase "A," cellular modem 100 enters half-duplex training phase "B" in step 710. In this phase, cellular modem 100 is silent during portion "B1," as represented by step 715. After portion "B1," cellular modem 100 moves to phase "B2" to train its own echo canceler. In accordance with the inventive concept, during phase "B2" cellular modem 100 first filters the received signal in step 720 to remove a pilot tone transmitted by far-end PSTN modem 300 (described below). Then, cellular modem 100 trains its echo cancelers on the filtered received signal in step 725. After half-duplex training portion "B2," cellular modem 100 enters full-duplex training phase "C" in step 730. After completion of training phase "C," cellular modem 100 enters the "DATA" phase in step 735.

Turning now to FIG. 4, corresponding steps are illustrated for PSTN modem 300, the answering modem. In step 805, PSTN modem 300 enters training, e.g., representative phase "A," shown in FIG. 2. Following training phase "A," PSTN modem 300 enters half-duplex training phase "B", in step 810. In portion "B1," PSTN modem 300 trains its own echo canceler in step 815. After portion "B1," PSTN modem enters phase "B2." However, in phase "B2" PSTN modem 300 is not silent, as in the prior art. Instead, PSTN modem 300 transmits a pilot tone to cellular modem 100 in step 820. For example, this pilot tone could illustratively be at a frequency of 300 Hz, at −20 dBm, for the duration of the half-duplex training phase "B2." After half-duplex training portion "B2," PSTN modem 300 discontinues transmission of the pilot tone and enters full-duplex training phase "C" in step 825. After completion of training phase "C," cellular modem 100 enters the "DATA" phase in step 830.

Figure 5:
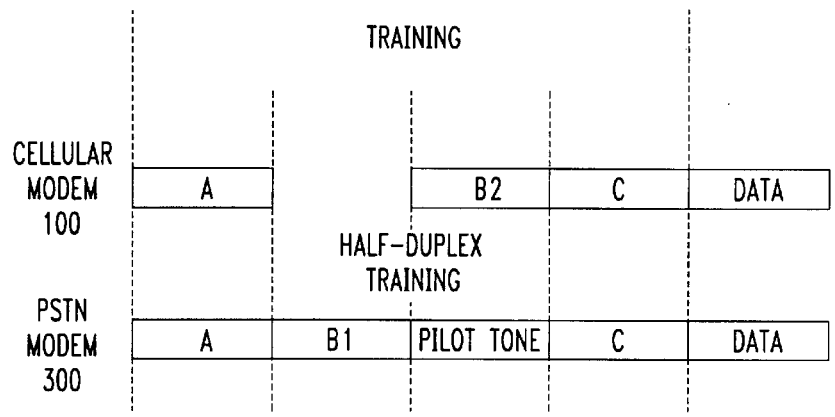
FIG. 5 shows an illustrative portion of a training sequence as modified by the inventive concept.

The effect of the methods shown in FIGS. 3 and 4 on the representative training sequence is shown in FIG. 5. In particular, training phase "B2," is no longer half-duplex but full-duplex. However, to avoid the above-mention complexities involved with full-duplex training of an echo canceler, cellular modem 100 filters out the pilot tone from the received signal before training its echo canceler. As a result of the above, if the compander (not shown) of cell site transceiver 255 has the above-mentioned non-linearity, then the transmission of the pilot tone by PSTN modem 300 moves the compander into its linear range of operation. This results in the proper training of the echo canceler in cellular modem 100 so that once full-duplex transmission begins there is no gain change in the echo path.

Figure 6:
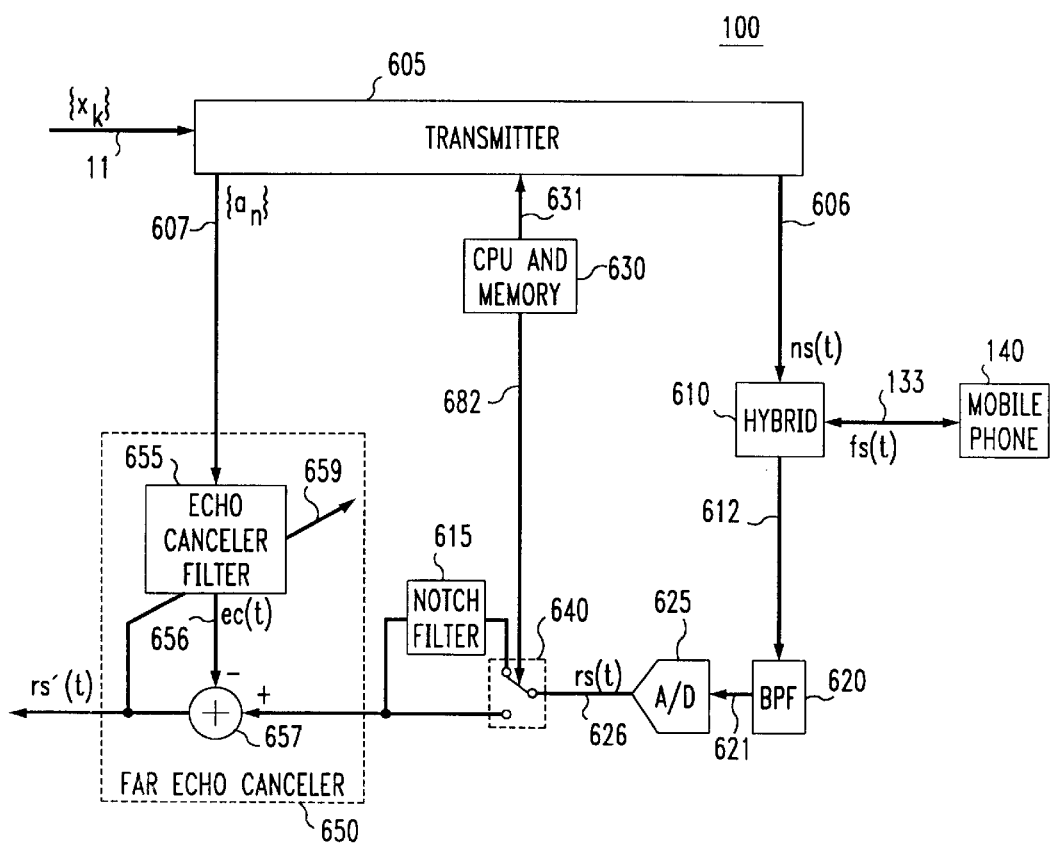
FIG. 6 is an illustrative block diagram of a portion of cellular modem 100 of FIG. 1 embodying the principles of the invention.
Figure 7:
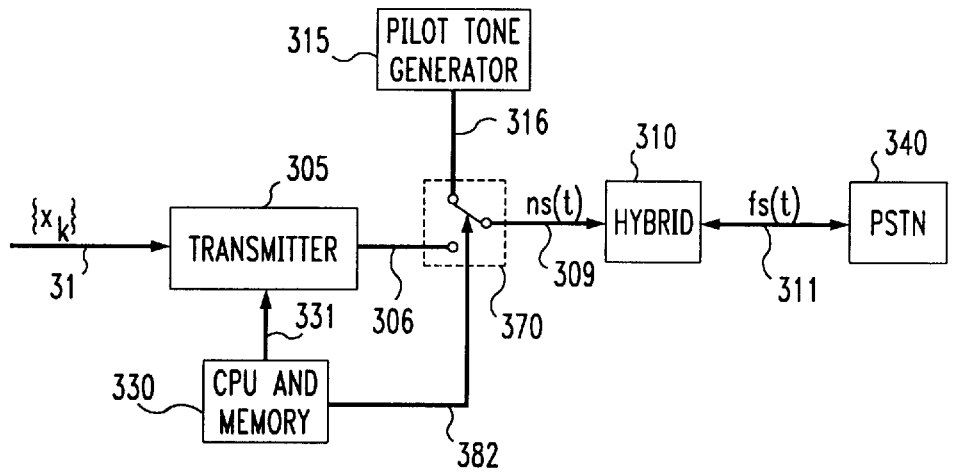
FIG. 7 is an illustrative block diagram of a portion of PSTN modem 300 of FIG. 1 embodying the principles of the invention.

Illustrative embodiments of the invention are shown in FIGS. 6 and 7 for cellular modem 100 and PSTN modem 300, respectively. Except for the inventive concept, the operation of the various components is well-known.

As shown in FIG. 6, a binary input data sequence {$x_k$} is provided by DTE 10 to cellular modem 100 on line 11. This input data sequence is processed by transmitter 605 to form a near-end transmitted signal, ns(t). Illustratively, near-end transmitted signal, ns(t), represents a quadrature amplitude modulated (QAM) signal. The near-end transmitted signal, ns(t), is provided by hybrid 610 to mobile phone 140, via line 133. (It should be noted that during training, the binary input sequence is generated by cellular modem 100 as in known in the art. For simplicity, this alternate source of the binary data sequence is not shown.)

Transmitter 605 is under the control of CPU and memory 630, which is a micro-processor based central processing unit and associated memory for storing program data. It is assumed that transmitter 605 includes an encoder, shaping filter, digital to analog converter, etc., for processing and modulating the input data sequence {$x_k$} on line 11 to provide the QAM signal, ns(t), on line 606. As part of this processing of the input data sequence, transmitter 605 represents the input data sequence as a sequence of complex-valued symbols {$a_n$}, at nominal rate 1/T symbols per second. (This processing may also include scrambling, redundancy and other forms of encoding.) As can be seen from FIG. 3, this input data sequence is also used by far echo canceler 650 (described below). For simplicity, the local echo canceler is not shown.

Turning now to the other direction of communication, an analog line signal, fs(t), transmitted from a far-end modem, e.g., PSTN modem 300, is received by hybrid 610 and is directed to bandpass filter (BPF) 620. This signal is referred to as the "far-end data signal," and utilizes the same frequency band as the transmitted signal, ns(t), i.e., cellular modem 100 is a full-duplex modem. Bandpass filter 620 removes energy outside the signal passband from the far-end data signal, which is then converted to digital form by analog-to-digital (A/D) converter 625 to form received signal rs(t).

The signal, fs(t), reaching the input of bandpass filter 620 is corrupted by so-called echo signals. Echo signals are typically introduced at each four-to-two wire conversion in the communications system.

The far-end echo signal comprises transmit signal energy from cellular modem 100 which was transmitted towards PSTN modem 300 in the first instance but was reflected back to cellular modem 100 as a result of, for example, an impedance mismatch at a two-to-four wire conversion within PSTN 340. The received signal, rs(t), provided by A/D converter 625, thus contains not only energy from the far-end data signal transmitted by PSTN modem 300, but also energy from the far-end echo signal.

In accordance with the principles of the invention, the received signal, rs(t), is applied to switch 640. The latter is under the control of the central processing unit of CPU and memory 630. During training phase "B2," the received signal, rs(t), includes the above-described pilot tone. Therefore, in the above-mentioned step 720 of FIG. 3, the central processing unit of CPU and memory 630 causes the received signal, rs(t), to be applied to notch filter 615 via switch 640. Notch filter 615 is a simple notch filter as known in the art and is designed to remove the above-described pilot tone from the received signal, rs(t). As a result, far echo canceler 650 does not receive the pilot tone and trains on only the far-echo signal present in the received signal, rs(t). After training far echo canceler 650, the central processing unit of CPU and memory 630 controls switch 640, in step 725 of FIG. 3, to remove notch filter 615 from the received signal path and applies received signal rs(t) directly to far echo canceler 650.

Turning now to FIG. 7, an illustrative block diagram of PSTN modem 300 embodying the principles of the invention is shown. A binary input data sequence {$x_k$} is provided by DTE 30 to PSTN modem 300 on line 31. This input data sequence is processed by transmitter 305 to form a near-end transmitted signal, ns(t). Illustratively, near-end transmitted signal, ns(t), represents a quadrature amplitude modulated (QAM) signal. The near-end transmitted signal, ns(t), is provided by hybrid 310 to PSTN 340, via line 311. (It should be noted that during training, the binary input sequence is generated by PSTN modem 300 as in known in the art. For simplicity, this alternate source of the binary data sequence is not shown.)

Transmitter 305 is under the control of CPU and memory 330, which is a microprocessor based central processing unit and associated memory for storing program data. It is assumed that transmitter 305 includes an encoder, shaping filter, digital to analog converter, etc., for processing and modulating the input data sequence on line 31 to provide the QAM signal, ns(t), on line 306. As part of this processing of the input data sequence, transmitter 305 represents the input data sequence as a sequence of complex-valued symbols $\{a_n\}$, at nominal rate 1/T symbols per second. (This processing may also include scrambling, redundancy and other forms of encoding.)

In accordance with the principles of the invention, PSTN modem 300 includes a means for generating the above-mentioned pilot tone, i.e., pilot tone generator 315 and switch 370. During training phase "B2," PSTN modem 300 transmits this pilot tone to cellular modem 100. In particular, during the above-mentioned step 820, the central processing unit of CPU and memory 330 controls switch 370, via line 382, to apply the pilot tone for transmission to cellular modem 100. After training phase "B2" has ended, the central processing unit of CPU and memory 330 controls switch 370 to apply the output signal from transmitter 305 to hybrid 310. As a result, PSTN modem 300 is not silent during the half-duplex portion of the training signal as in the prior art.

Figure 8:
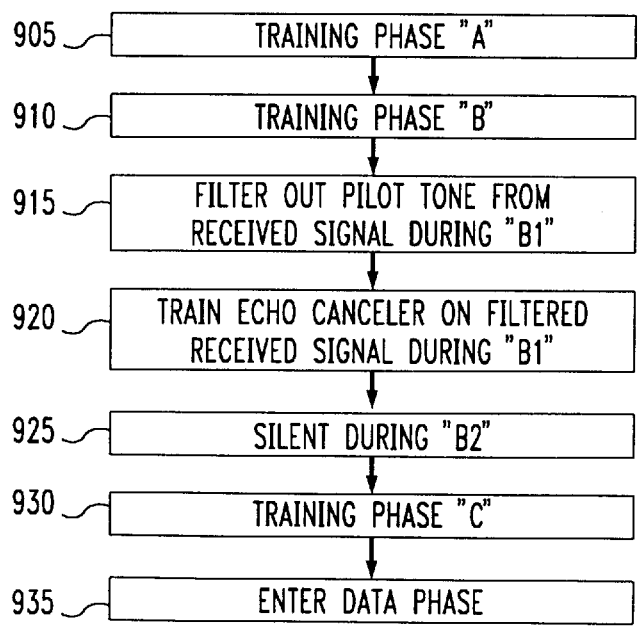
FIGS. 8–10 show the inventive concept when the cellular modem is the "answering" modem.
Figure 9:
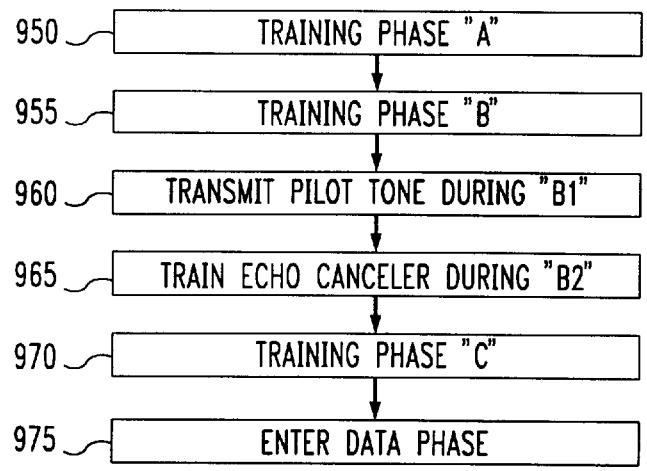
Figure 10:
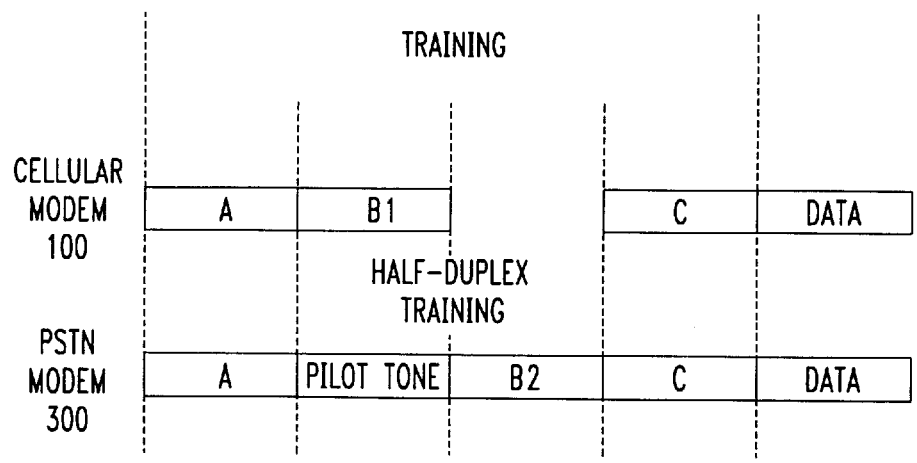

It should be noted that although an illustrative switch is shown in FIGS. 6 and 7 for the purposes of description, those in the art would realize that modifications to corresponding algorithms in a digital signal processor (not shown) would be equivalent. For example, in FIG. 7 transmitter 305 represents a digital signal processor that is programmed to provide corresponding handshaking signaling. As a result, to implement this inventive concept, transmitter 305 is simply reprogrammed to generate the above-mentioned pilot tone during training phase "B2." Further, it should be noted that although the invention was described in the context of a called, or answering, modem providing the pilot tone, the inventive concept also applies to a calling, or originating, modem providing the pilot tone to the answering modem, which now filters out the pilot tone to train its echo canceler. This case is illustrated in FIGS. 8–10.

The foregoing merely illustrates the principles of the invention and it will thus be appreciated that those skilled in the art will be able to devise numerous alternative arrangements which, although not explicitly described herein, embody the principles of the invention and are within its spirit and scope.

For example, although the invention is illustrated herein as being implemented with discrete functional building blocks, e.g., an echo canceler, etc., the functions of any one or more of those building blocks can be carried out using one or more appropriate programmed processors, e.g., a digital signal processor.

In addition, although the inventive concept was described in the context of a cellular data connection this invention is applicable to the PSTN network. Also, although the invention was described in the context of using a pilot tone, other signals can be used so long as the signal causes the above-mentioned compander to enter the linear range of operation and the receiver can appropriately cancel this signal before training its echo canceler. Those skilled in the art would realize that although shown in the context of a hybrid, some cellular modems have a four-wire interface to the cellular transceiver. In addition, it should be realized that the above-described inventive concept could be selectively enabled by a user via use of the well-known "AT-command set."

What is claimed:

1. Data communications equipment apparatus comprising:
    an echo canceler that is trained during an echo-canceler training phase of a half duplex training sequence with a far-end data communications equipment while the communication channel is operating in a linear mode; and
    a filter that filters a received signal during the echo-canceler training phase to remove a pilot signal transmitted by the far-end data communications equipment before application of the received signal to the echo canceler to train the echo canceler on an echo signal component thereof.

2. The apparatus of claim 1 comprising transmitter circuitry that transmits a training signal during the half-duplex training phase to act as a source for the echo signal.

3. A method for training an echo canceler during a training sequence of a data connection, the method comprising the steps of:
    transmitting a training signal to far-end data communications equipment;
    receiving, during a half-duplex training sequence, a signal that comprises an echo signal of the training signal and a pilot signal transmitted by the far-end communications equipment;
    filtering the received signal to remove the pilot signal to provide a filtered signal; and
    training the echo canceler on the filtered signal while the communications channel is operating in a linear mode.

4. The method of claim 3 wherein the pilot signal is a tone.

5. A method for training an echo canceler during a training sequence of a data connection, the method comprising the steps of:
    performing a half-duplex training sequence with an opposite data communications equipment that includes the step of transmitting a pilot signal during that portion of said half-duplex training sequence in which the opposite data communications equipment trains its echo canceler while the communication channel is operating in a linear mode; and
    communicating data in a data phase of the data connection subsequent to said half-duplex training sequence.

6. The method of claim 5 wherein the pilot signal is a tone.

* * * * *